(12) United States Patent
MacLean et al.

(10) Patent No.: US 8,526,612 B2
(45) Date of Patent: Sep. 3, 2013

(54) SELECTIVE AND PERSISTENT APPLICATION LEVEL ENCRYPTION FOR VIDEO PROVIDED TO A CLIENT

(75) Inventors: Charles Duncan MacLean, Claremont, CA (US); Thomas Inskip, Lauderhill, FL (US)

(73) Assignee: Google Inc., Mountain View, CA (US)

( * ) Notice: Subject to any disclaimer, the term of this patent is extended or adjusted under 35 U.S.C. 154(b) by 1003 days.

(21) Appl. No.: 11/619,337

(22) Filed: Jan. 3, 2007

(65) Prior Publication Data
US 2007/0160208 A1 Jul. 12, 2007

Related U.S. Application Data

(60) Provisional application No. 60/757,055, filed on Jan. 6, 2006.

(51) Int. Cl.
*H04N 7/167* (2011.01)
*H04N 5/783* (2006.01)

(52) U.S. Cl.
USPC ........... 380/210; 380/200; 380/201; 380/239; 386/343; 386/351

(58) Field of Classification Search
None
See application file for complete search history.

(56) References Cited

U.S. PATENT DOCUMENTS

| | | |
|---|---|---|
| 4,535,355 A | 8/1985 | Arn et al. |
| 4,694,489 A | 9/1987 | Frederiksen |
| 5,067,035 A | 11/1991 | Kudelski et al. |
| 5,134,656 A | 7/1992 | Kudelski |
| 5,144,663 A | 9/1992 | Kudelski et al. |
| 5,375,168 A | 12/1994 | Kudelski |
| 5,539,450 A | 7/1996 | Handelman |
| 5,590,200 A | 12/1996 | Nachman et al. |

(Continued)

FOREIGN PATENT DOCUMENTS

| | | |
|---|---|---|
| EP | 658054 B1 | 6/1995 |
| EP | 714204 B1 | 5/1996 |

(Continued)

OTHER PUBLICATIONS

International Search Report and Written Opinion mailed Feb. 14, 2008, for International Application No. PCT/US07/60075 (9 pages).

(Continued)

*Primary Examiner* — Ashok Patel
*Assistant Examiner* — Alexander Lagor
(74) *Attorney, Agent, or Firm* — Frommer Lawrence & Haug LLP; John W. Branch

(57) ABSTRACT

A system, apparatus, and method are directed towards allowing ingestion of encrypted content into such as a VOD server, or PVR, or the like by selectively encrypting portions of a content stream based on various selection rules. In one embodiment, the selection rules include leaving selected portions of the content stream unencrypted, including packets that include a PES header; or video packets that include various trick play data such as picture start, GOP start, sequence start, sequence end data; PIDs associated with a PAT, PMT, or the like; while other portions of the content stream may be encrypted, including video and/or audio PIDs, or other video and/or audio portions. In still another embodiment, Entitlement Control Messages (ECMs) may be inserted that employ an encryption/decryption key rotation scheme, such as odd and/or even scrambling control bit structures, which may also be rotated based on a variety of conditions.

22 Claims, 6 Drawing Sheets

(56) References Cited

U.S. PATENT DOCUMENTS

| | | | |
|---|---|---|---|
| 5,592,212 | A | 1/1997 | Handelman |
| 5,621,799 | A | 4/1997 | Katta et al. |
| 5,640,546 | A | 6/1997 | Gopinath et al. |
| 5,666,412 | A | 9/1997 | Handelman et al. |
| 5,684,876 | A | 11/1997 | Pinder et al. |
| 5,758,257 | A | 5/1998 | Herz et al. |
| 5,774,527 | A | 6/1998 | Handelman et al. |
| 5,774,546 | A | 6/1998 | Handelman et al. |
| 5,799,089 | A | 8/1998 | Kuhn et al. |
| 5,805,705 | A | 9/1998 | Gray et al. |
| 5,870,474 | A | 2/1999 | Wasilewski et al. |
| 5,878,134 | A | 3/1999 | Handelman et al. |
| 5,883,957 | A | 3/1999 | Moline et al. |
| 5,892,900 | A | 4/1999 | Ginter et al. |
| 5,910,987 | A | 6/1999 | Ginter et al. |
| 5,915,019 | A | 6/1999 | Ginter et al. |
| 5,917,912 | A | 6/1999 | Ginter et al. |
| 5,920,625 | A | 7/1999 | Davies |
| 5,920,861 | A | 7/1999 | Hall et al. |
| 5,922,208 | A | 7/1999 | Demmers |
| 5,923,666 | A | 7/1999 | Gledhill et al. |
| 5,933,498 | A | 8/1999 | Schneck et al. |
| 5,939,975 | A | 8/1999 | Tsuria et al. |
| 5,943,422 | A | 8/1999 | Van Wie et al. |
| 5,949,876 | A | 9/1999 | Ginter et al. |
| 5,982,891 | A | 11/1999 | Ginter et al. |
| 5,991,399 | A | 11/1999 | Graunke et al. |
| 6,009,116 | A | 12/1999 | Bednarek et al. |
| 6,009,401 | A | 12/1999 | Horstmann |
| 6,009,525 | A | 12/1999 | Horstmann |
| 6,021,197 | A | 2/2000 | von Willich et al. |
| 6,035,037 | A | 3/2000 | Chaney |
| 6,038,433 | A | 3/2000 | Vegt |
| 6,049,671 | A | 4/2000 | Slivka et al. |
| 6,055,503 | A | 4/2000 | Horstmann |
| 6,073,256 | A | 6/2000 | Sesma |
| 6,112,181 | A | 8/2000 | Shear et al. |
| 6,138,119 | A | 10/2000 | Hall et al. |
| 6,157,721 | A | 12/2000 | Shear et al. |
| 6,178,242 | B1 | 1/2001 | Tsuria |
| 6,185,683 | B1 | 2/2001 | Ginter et al. |
| 6,189,097 | B1 | 2/2001 | Tycksen, Jr. et al. |
| 6,191,782 | B1 | 2/2001 | Mori et al. |
| 6,226,794 | B1 | 5/2001 | Anderson, Jr. et al. |
| 6,237,786 | B1 | 5/2001 | Ginter et al. |
| 6,240,185 | B1 | 5/2001 | Van Wie et al. |
| 6,247,950 | B1 | 6/2001 | Hallam et al. |
| 6,253,193 | B1 | 6/2001 | Ginter et al. |
| 6,256,668 | B1 | 7/2001 | Slivka et al. |
| 6,272,636 | B1 | 8/2001 | Neville et al. |
| 6,285,985 | B1 | 9/2001 | Horstmann |
| 6,292,569 | B1 | 9/2001 | Shear et al. |
| 6,298,441 | B1 | 10/2001 | Handelman et al. |
| 6,314,409 | B2 | 11/2001 | Schneck et al. |
| 6,314,572 | B1 | 11/2001 | LaRocca et al. |
| 6,334,213 | B1 | 12/2001 | Li |
| 6,363,488 | B1 | 3/2002 | Ginter et al. |
| 6,389,402 | B1 | 5/2002 | Ginter et al. |
| 6,405,369 | B1 | 6/2002 | Tsuria |
| 6,409,080 | B2 | 6/2002 | Kawagishi |
| 6,409,089 | B1 | 6/2002 | Eskicioglu |
| 6,415,031 | B1 | 7/2002 | Colligan et al. |
| 6,427,140 | B1 | 7/2002 | Ginter et al. |
| 6,449,367 | B2 | 9/2002 | Van Wie et al. |
| 6,449,719 | B1 | 9/2002 | Baker |
| 6,459,427 | B1 | 10/2002 | Mao et al. |
| 6,466,670 | B1 | 10/2002 | Tsuria et al. |
| 6,505,299 | B1 | 1/2003 | Zeng et al. |
| 6,587,561 | B1 | 7/2003 | Sered et al. |
| 6,618,484 | B1 | 9/2003 | Van Wie et al. |
| 6,629,243 | B1 | 9/2003 | Kleinman et al. |
| 6,634,028 | B2 | 10/2003 | Handelmann |
| 6,640,304 | B2 | 10/2003 | Ginter et al. |
| 6,651,170 | B1 | 11/2003 | Rix |
| 6,654,420 | B1 | 11/2003 | Snook |
| 6,654,423 | B2 | 11/2003 | Jeong et al. |
| 6,658,568 | B1 | 12/2003 | Ginter et al. |
| 6,668,325 | B1 | 12/2003 | Collberg et al. |
| 6,965,674 | B2* | 11/2005 | Whelan et al. ............... 380/270 |
| 7,240,196 | B2 | 7/2007 | Cooper et al. |
| 2002/0001385 | A1 | 1/2002 | Kawada et al. |
| 2002/0015498 | A1 | 2/2002 | Houlberg et al. |
| 2002/0021805 | A1 | 2/2002 | Schumann et al. |
| 2002/0089410 | A1 | 7/2002 | Janiak et al. |
| 2002/0104004 | A1 | 8/2002 | Couillard |
| 2002/0141582 | A1 | 10/2002 | Kocher et al. |
| 2003/0007568 | A1 | 1/2003 | Hamery et al. |
| 2004/0049691 | A1* | 3/2004 | Candelore et al. ............ 713/193 |
| 2004/0062398 | A1* | 4/2004 | Unger ........................... 380/277 |
| 2005/0094809 | A1* | 5/2005 | Pedlow et al. ................. 380/200 |
| 2006/0115083 | A1* | 6/2006 | Candelore et al. ............ 380/216 |
| 2008/0015999 | A1* | 1/2008 | Ali et al. ......................... 705/52 |

FOREIGN PATENT DOCUMENTS

| | | |
|---|---|---|
| EP | 0886409 A2 | 12/1998 |
| WO | WO-96/06504 A1 | 2/1996 |
| WO | WO-96/32702 A1 | 10/1996 |
| WO | WO-99/30499 A1 | 6/1999 |
| WO | WO-99/54453 A1 | 10/1999 |
| WO | WO-01/35571 A1 | 5/2001 |
| WO | WO-01/93212 A2 | 12/2001 |
| WO | WO-02/21761 A2 | 3/2002 |

OTHER PUBLICATIONS

Yoshida, Kazuhiro, et al., "A Continuous-media Communication Method for Minimizing Playback interruptions", IS&T/SPIE Conference on Visual Communications and Immage Processing, Jan. 1999, San Jose, California, vol. 3653.

"Irdeto Access & Optibase create Strategic Alliance", Press Release, Optibase, pp. 1-4, Dec. 14, 2000. http://www.irdetoaccess.com/press/0000041.htm.

Hunter, J., et al., "A Review of Video Streaming Over the Internet", DSTC Technical Report TR97-10, pp. 1-28., Aug. 1997.

Blumenfeld, Steven, "System Security, Streaming Media", Broadcast Engineering magazine, pp. 1-2, Oct. 2001.

Eskiciouglu, A. and Delp, E., "An overview of multimedia content protection in consumer electronics devices", SP:IC, 16(72): pp. 681-699, Apr. 2001.

Forrest, S., "Research Projects", pp. 1-3, Dec. 2, 2003. http://www.cs.unm.edu/~forrest/projects.html.

Schulzrinne, H., et al., Real Time Streaming Protocol (RTSP), RFC 2326, pp. 1-86, Apr. 1998.

Cheng, H.C.H., "Partial Encryption for Image and Video Communication", Department of Computing Science, University of Alberta, pp. 1-87, Fall, 1998.

Balthrop, Justin, et al., "Coverage and Generalization in an Artificial Immune System", Proceedings of Genetic and Evolutionary Computation Conference (GECCO), pp. 1-8, 2002.

Griwodz, Carsten, "Video Protection by Partial Content Corruption", Multimedia and Security Workshop at ACM Multimedia, Bristol, UK, pp. 1-5, Sep. 1998.

"Irdeto Access & Optibase create Strategic Alliance", Press Release, Optibase, pp. 1-2, Dec. 14, 2000. http://www.optibase.com/html/news/December_14_2000.html.

"Establishing Interconnectivity among Various Makers' Products through Standardizatin of VOD Protocol", NTT Corporation Press Release, Sep. 27, 2002. http://www.ntt.co.jp/news/news02e/0209/020927.html.

Intelligent Systems for Finance and Business, Goonatilake, Suran, ed. et al., Chapters 2-10, pp. 31-173, 1995.

Spanos, George, et al., "Performance Study of a Selective Encryption Scheme for the Security of Networked, Real-Time Video", Proceedings of the 4th ICCN, Las Vegas, NV, pp. 2-10, Sep. 1995.

"Riding the Media Bits Protecting content", chiariglione.org, 4 pages, Aug. 8, 2003. Can be found at http://www.chiariglione.ord/ride/protecting_content/protecting_content.htm.

"Technologies and Sevices on Digital Broadcasting (6)—Scrambiing (Conditional Access System)", Broadcast Technology No. 12, pp. 10-13, Autumn 2002.

Hewitt, Rod, "TSReader—Analyze, Decode and Record MPEG-2 Transport Streams", 36 pages, Nov. 24, 2003. Can be found at http://www.coolstf.com/mpeg/.

Wu, Tsung-Li et al., Selective Encryption and Watermarking of MPEG Video (Extended Abstract), Feb. 17, 1997, International Conference on Image Science, Systems, and Technology, 10 pgs.

* cited by examiner

SELECTIVE AND PERSISTENT APPLICATION LEVEL ENCRYPTION FOR VIDEO PROVIDED TO A CLIENT

CROSS-REFERENCE TO RELATED APPLICATIONS

The present application claims benefit of provisional application Ser. No. 60/757,055 entitled "Selective And Persistent Application Level Encryption For Video Provided To A Client," filed on Jan. 6, 2006, the benefit of the earlier filing date of which is hereby claimed under 35 U.S.C. §119 (e) and 37 C.F.R. §1.78, and which is further incorporated by reference.

FIELD OF THE INVENTION

This invention relates generally to computing security, and more particularly but not exclusively, to selectively encrypting content based on a selection rule, that includes maintaining trick play data and associated stream data in the clear.

BACKGROUND OF THE INVENTION

Recent advances in the telecommunications and electronics industry, and, in particular, improvements in digital compression techniques, networking, and hard drive capacities have led to growth in new digital services to a user's home. For example, such advances have provided hundreds of cable television channels to users by compressing digital data and digital video, transmitting the compressed digital signals over conventional coaxial cable television channels, and then decompressing the signals in the user's receiver. One application for these technologies that has received considerable attention recently includes video-on-demand (VOD) systems where a user may communicate with a service operator to request media content and the requested content is routed to the user's home for enjoyment. The service operator typically obtains the content from an upstream content provider, such as a content owner, distributor, and the like.

However, to protect such content from unauthorized use, service operators, content providers, owners, and so forth, may employ a service known as conditional access. Conditional access enables a provider to restrict selected content to selected users. This may be achieved, for example by encrypting the content. A content provider, content owner, or the like, may wish to encrypt the content as early in a distribution stream as possible to protect the content from piracy.

However, today's users may want to perform various actions on the content, including fast forwarding through a portion of the content, fast reversing, and the like. Such "trick plays" are typically managed by generating additional file information from the content. Creation of these trick play files may be difficult when the content is encrypted. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
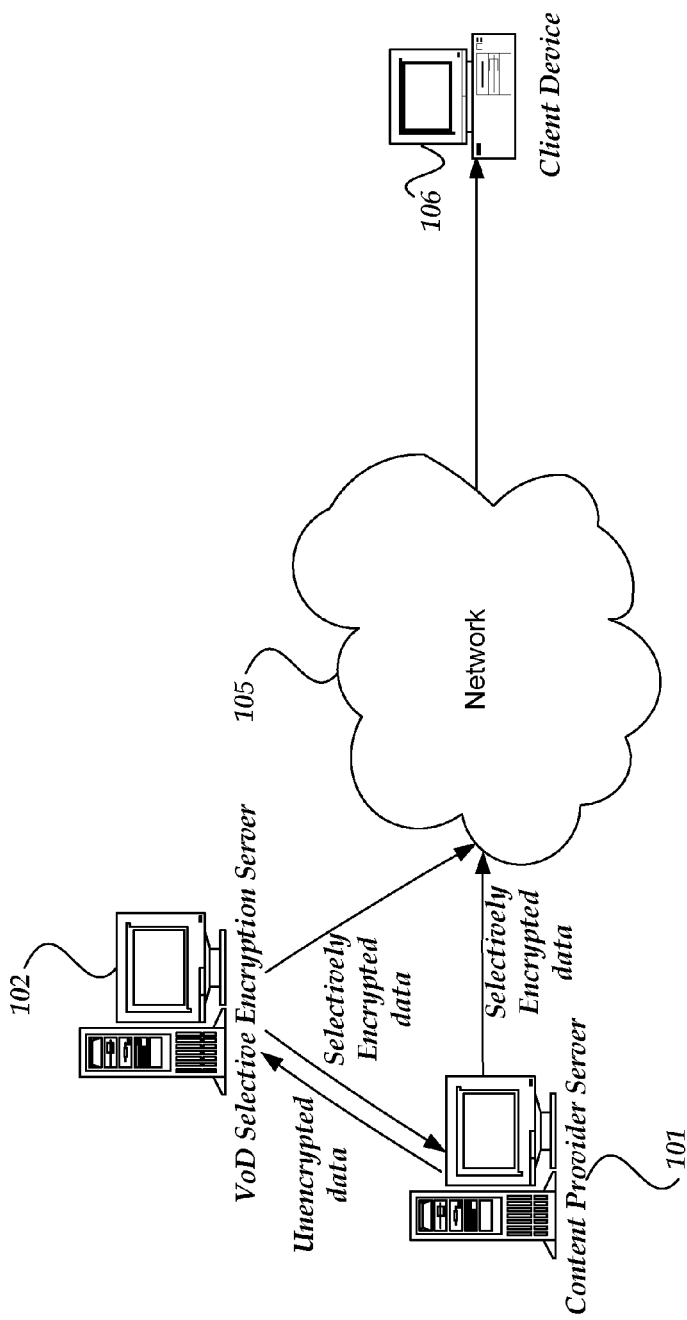
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, the present invention is directed towards a system, apparatus, and method that allow ingestion of encrypted content into such as a VOD server, Personal Video Recorder (PVR), or other digital program device. The ingestion for PVRs, VODs and the like, involves creation of trick play indices that typically are not possible with traditional video scrambling, or encryption, technologies. The present invention, however, selectively encrypts portions of a content stream based on various selection rules. For example, in one embodiment, the selection rules include leaving selected portions in the clear or unencrypted, including packets that include a Packetized Elementary Stream (PES) header, or video packets that include various trick play data such as picture start, Group of Pictures (GOP) start, sequence start, sequence end data, or the like. Another selection rule may leave in the clear such Packet IDentifiers (PIDs) associated with a Program Association Table (PAT), Program Map Table (PMT), or the like. Based on the selection rules, other portions of the content stream may be selectively encrypted, including, but not limited to video and/or audio PIDs, or other video and/or audio portions. In still another embodiment, the selection rules may indicate that random video and/or audio payloads may be encrypted, while other video and/or audio payloads may remain unencrypted (in the clear). Such selection rules may, for example, be employed to support such activities as decryption in real-time for Set-Top-Boxes (STBs), or the like, that may be considered to be resource constrained. In addition, in one embodiment, the selective encrypted is at a transport stream (TS) packet level.

In addition, the invention may insert Entitlement Control Message (ECM) packets into the content stream that may employ encryption/decryption key rotations. For example, in one embodiment, the invention may employ odd and/or even scrambling control bits, which may be used to indicate a selective rotation, or varying, of a type or use of encryption, and related encryption keys.

Moreover, in one embodiment, the ECM may include two keys, one key for a current cryptoperiod, and another key for a next cryptoperiod. The ECMs transmission may be offset within a content stream by minus about half a cryptoperiod, with ECMs being inserted into the stream at a pre-determined number of times per second. In one embodiment, the pre-determined number of times per second is based, at least in part, on a Program Clock Reference (PCR). In one embodiment, the ECM may be inserted within a transport stream after about each I frame header.

The selectively encrypted content stream may then be employed to generate trick play files, such as a fast forward file, fast reverse file, and so forth. In addition, the selectively encrypted content stream may be used to generate a corresponding index file that indicates locations of relevant content frames in the content stream and the trick play files. By employing the selectively encrypted content stream, index files may be readily generated without a need to re-index content streams, thereby reducing an overall processing cost, time, and a possibility of reprocessing content streams. Moreover, the invention enables selective encryption to be performed before ingestion to a VOD server, or the like, further enhancing security of the content. In addition, the invention enables such selective encryption to be applied to a broadcast environment, including those that may include a PVR at such as an STB, or the like.

Illustrative Environment

FIG. 1 shows a functional block diagram illustrating one embodiment of operating environment 100 in which the invention may be implemented. Operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes content provider server 101, VOD Selective Encryption Server (SES) 102, network 105, and client device 106. Network 105 is in communication with and enables communication between SES 102, content provider server 101, and client device 106. SES 102 is also in communications content provider server 101.

Content provider server 101 includes virtually any computing device that may be configured for use by producers, developers, and owners of media content that can be distributed to client device 106. Such content, includes, but is not limited to motion pictures, movies, videos, music, pay per view (PPV), VOD, interactive media, audios, still images, text, graphics, and other forms of digital content directed towards a user of a client device, such as client device 106.

Content provider server 101 may also include businesses, systems, and the like that obtain rights from a content owner to copy and distribute the content. Content provider server 101 may obtain the rights to copy and distribute from one or more content owners. Content provider server 101 may repackage, store, and schedule content for subsequent sale, distribution, and license to other content providers, users of client device 106, or the like.

In one embodiment, content provider server 101 may provide unencrypted content to SES 102 for use in selectively encrypting the content. In another embodiment, SES 102 may then provide the selectively encrypted content to content provider server 101. Content provider server 101 may provide the received selectively encrypted content stream towards client device 106. In one embodiment, the encrypted content stream may be sent as a broadcast to client device 106, where client device 106 may then be enabled to decrypt the received content stream.

Devices that may operate as content provider server 101 include personal computers, desktop computers, multiprocessor systems, microprocessor-based or programmable consumer electronics, network PCs, servers, and the like.

SES 102 is described in more detail below in conjunction with FIG. 2. Briefly, however, SES 102 includes virtually any computing device that is configured to receive unencrypted content and provide a selectively encrypted content stream. In one embodiment, SES 102 may receive the unencrypted content from content provider server 101. However, the invention is not so limited, and SES 102 may also receive the unencrypted content from a variety of other sources, including, for example, a portable storage medium, over network 105 from a different content provider, or the like. In any event, in one embodiment, SES 102 may provide selectively encrypted content to content provider 101 for distribution to client 106. In another embodiment, SES 102 may provide the selectively encrypted content to client 106, or the like. In one embodiment, SES 102 may employ a process substantially similar to process 500 described below in conjunction with FIG. 5.

Although SES 102 and content provider server 101 are illustrated as distinct devices, the invention is not so limited, and in one embodiment, SES 102 and content provider server 101 may be integrated into a single computing device, or even distributed across more than two computing devices, without departing from the scope or spirit of the invention.

Network 105 is configured to enable various computing devices to send/receive messages, including files, content streams, or the like. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (IS-DNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 105 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for computing devices with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, network 105 includes any communication method by which information may travel between one computing device and another computing device.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Although the invention illustrates the content being sent over network 105 to client device 106, the invention is not so limited. For example, the content may also be provided using virtually any other content delivery medium, including, but not limited to CDs, DVDs, tape, electronic memory devices, or the like.

One embodiment of a client device 106 is described in more detail below in conjunction with FIG. 3. Briefly, however, client device 106 may include virtually any computing device capable of receiving content over a network from another computing device, such as content provider server 101, SES 102, or the like. Client device 106 may also include any computing device capable of receiving the content employing other mechanisms, including, but not limited to CDs, DVDs, tape, electronic memory devices, or the like. The set of such devices may include devices that typically connect using a wired communications medium such as personal computers, multiprocessor systems, microprocessor-based or programmable consumer electronics, network PCs, or the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Client device 106 may also be any device that is capable of connecting using a wired or wireless communication medium such as a PDA, POCKET PC, wearable computer, and any other device that is equipped to communicate over a wired and/or wireless communication medium to receive and play content. Similarly, client device 106 may employ any of a variety of devices to enjoy such content, including, but not limited to, a computer display system, an audio system, a jukebox, set top box (STB), a television, video display device, or the like.

Client device 106 may include a client application that is configured to enable an end-user to receive content and to play the received content. The client application may also provide other actions, including, but not limited to, enabling other components of the client device to execute, enable an interface with another component, device, the end-user, and the like.

In one embodiment, the client application may selectively encrypt decrypted content. For example, client device 106 may received encrypted content from content provider server 101, and/or selectively encrypted content from SES 102. The client application may then enable decryption of the selectively encrypted content for use by client device 106.

The client application however, also may be configured to ensure protection of the decrypted content by subsequently selectively encrypting at least a portion of the exposed unencrypted content. In one embodiment, the client application may also employ a process substantially similar to process 600 described below in conjunction with FIG. 6 to perform at least some of its actions.

Illustrative Server Environment

Figure 2:
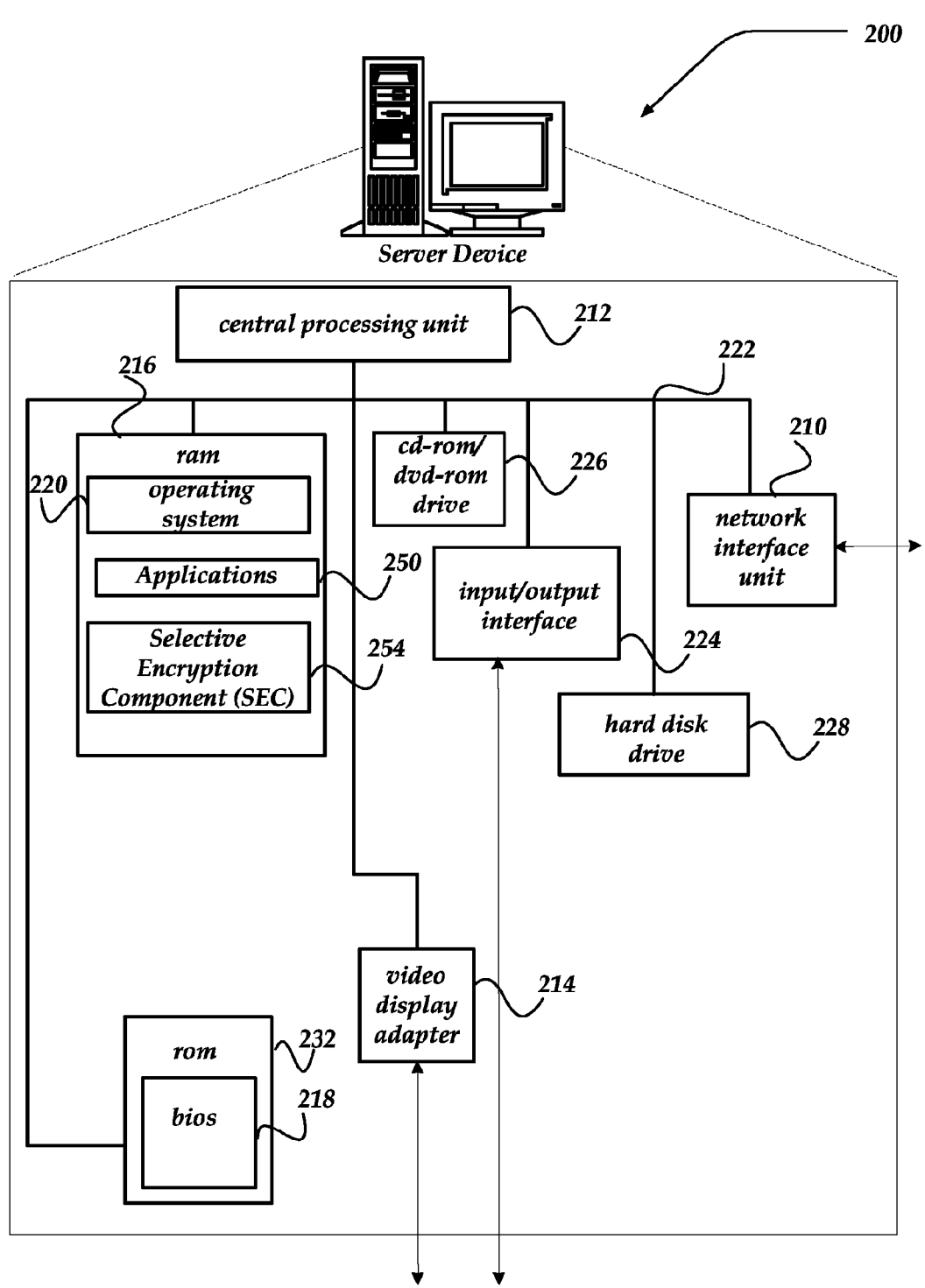
FIG. 2 shows one embodiment of a server device that may be included in a system implementing the invention.

FIG. 2 shows one embodiment of a server device, according to one embodiment of the invention. Server device 200 may include many more components than those shown. The components shown, however, are sufficient to disclose an illustrative embodiment for practicing the invention. Server device 200 may, for example, represent SES 102 of FIG. 1.

Server device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of server device 200. Any general-purpose operating system may be employed. Basic input/output system ("BIOS") 218 is also provided for controlling the low-level operation of server device 200. As illustrated in FIG. 2, server device 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, network interface card (NIC), and the like.

Server device 200 may also include an SMTP handler application for transmitting and receiving email. Server device 200 may also include an HTTP handler application for receiving and handing HTTP requests, and an HTTPS handler application for handling secure connections. The HTTPS handler application may initiate communication with an external application in a secure fashion.

Server device 200 also may include input/output interface 224 for communicating with external devices, such as a mouse, keyboard, scanner, or other input devices not shown in FIG. 2. Likewise, server device 200 may further include additional mass storage facilities such as CD-ROM/DVD-ROM drive 226 and hard disk drive 228. Hard disk drive 228 is utilized by server device 200 to store, among other things, application programs, databases, and the like.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, transcoders, database programs, word processing programs, spreadsheet programs, and so forth. Mass storage may further include applications such Selective Encryption Component (SEC) 254.

SEC 254 may be configured to receive unencrypted content and based in part on a selection rule, selectively encrypt at least a portion of the content. In one embodiment, SEC 254 provides a selectively encrypted content stream. In one embodiment, SEC 254 may employ a process substantially similar to process 600 of FIG. 6 to perform at least some of its actions. In one embodiment, the selectively encrypted content stream is a Moving Pictures Experts Group (MPEG) content stream, such as a transport stream.

Briefly, MPEG is an encoding and compression standard for digital broadcast content. MPEG provides compression support for television quality transmission of video broadcast content. Moreover, MPEG provides for compressed audio, control, and even user broadcast content. One embodiment of MPEG-2 standards is described in ISO/IEC 13818-7 (available through the International Organization for Standardization (ISO)), which is hereby incorporated by reference.

MPEG content streams include Packetized Elementary Streams (PES), which typically include fixed (or variable sized) blocks or frames of an integral number of elementary streams (ES) access units. An ES typically is a basic component of an MPEG content stream, and includes digital control data, digital audio, digital video, and other digital content (synchronous or asynchronous). A group of tightly coupled PES packets referenced to substantially the same time base comprises an MPEG program stream (PS). Each PES packet also may be broken into fixed-sized transport packet known as MPEG Transport Streams (TS) that form a general-purpose approach of combining one or more content streams, possible including independent time bases. Moreover, MPEG frames include intra-frames (I-frames), forward predicted frames (P-frames), and bi-directional predicted frames (B-frames).

SEC 254 may selectively encrypt at least a portion of the content stream using any of a variety of encryption techniques, including, but not limited to Advanced Encryption Standard (AES), RSA Labs Inc.'s ("RSA's") RC6, IBM's MARS, TwoFish, Serpent, CAST-256, International Data Encryption Algorithm (IDEA), Data Encryption Standard (DES), Triple DES, DES-EDE2, DES-EDE3, DESX, DES-XEX3, RC2, RC5, Blowfish, Diamon2, TEA, SAFER, 3-WAY, GOST, SHARK, CAST-128, Square, Skipjack, Panama, ARC4, SEAL, WAKE, Sapphire II, BlumBlumShub, RSA, DSA, ElGamal, Nyberg-Rueppel (NR), BlumGoldwasser, Rabin, Rabin-Williams (RW), LUC, LUCELG, ECDSA, ECNR, ECIES, ECDHC, ECMQVC, and/or any other encryption algorithm. Moreover SEC 254 may perform such encryption on-the-fly.

In addition, SEC 254 may selectively encrypt one portion of the content stream using one encryption technique, and another portion of the content stream using a different encryption technique. SEC 254 may further employ different content encryption keys for different portions of the selectively encrypted content stream.

In one embodiment, SEC 254 may employ a key rotation mechanism, wherein the encryption keys may be rotated between different keys over time. For example, in one embodiment, SEC 254 may employ two encryption keys, based on an odd, or an even scrambling control bit. In one embodiment, SEC 254 may selectively modify a transport packet header to indicate whether the scrambling control bit is odd or even. Then, SEC 254 may employ one key for selectively encrypting at least one portion of the content stream, and then at some other time, switch the scrambling control bit to indicate that a different encryption key is being employed. In one embodiment, SEC 254 may randomly switch or rotate between keys. In another embodiment, SEC 254 may rotate between keys based on a pre-determined period of time, event, or the like. Thus, in one embodiment, two encryption keys may be used; one of the keys may be used for a current cryptoperiod and another key for a next cryptoperiod within the selectively encrypted content stream.

Figure 4:
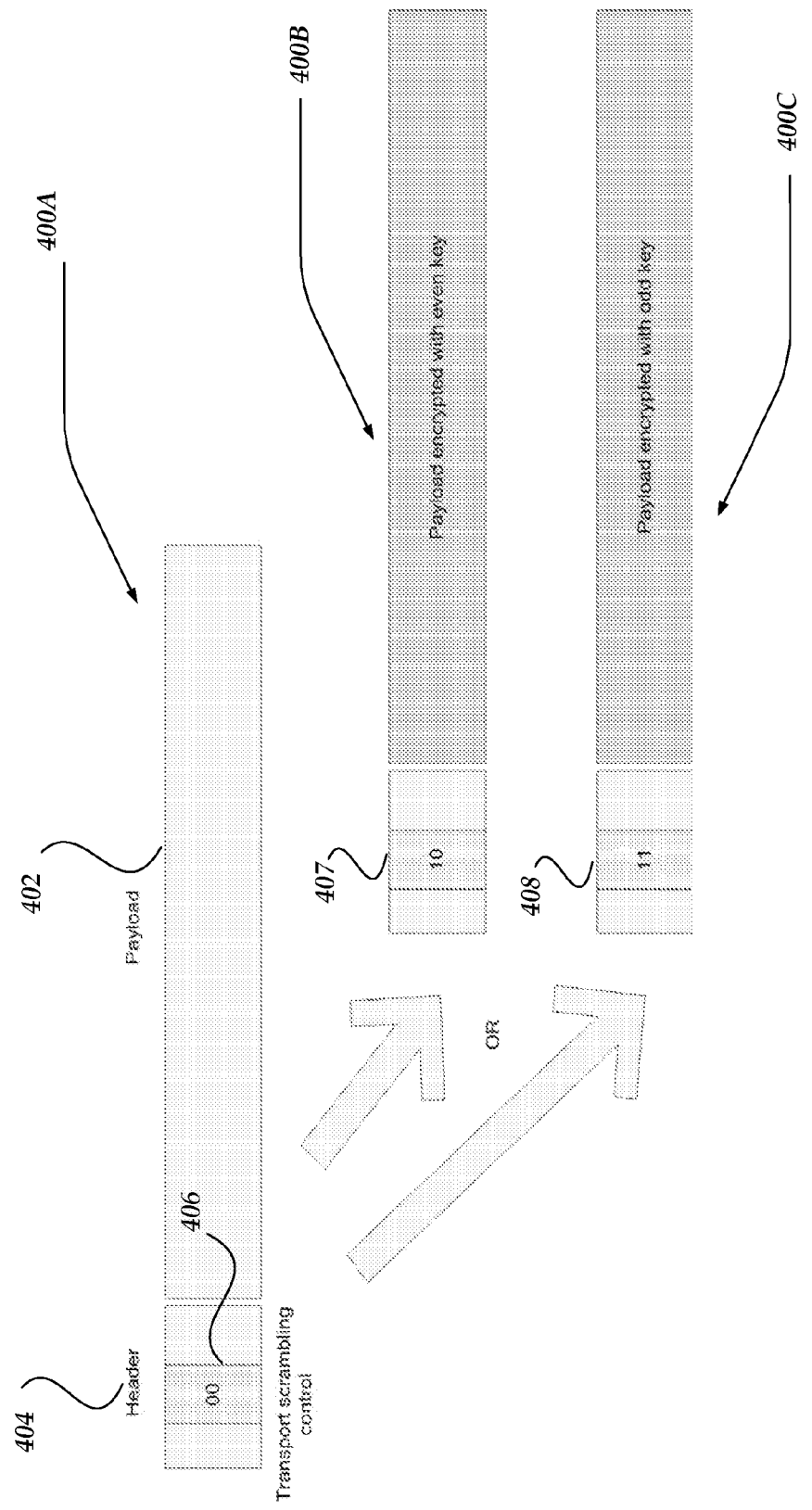
FIG. 4 illustrates functional diagrams generally showing one embodiment for encrypting a transport packet showing possible scrambling controls.

Referring to FIG. 4, FIG. 4 illustrates one embodiment of a transport packet showing scrambling control bits. As shown, transport packet 400A includes payload 402 and header 404. Typically, payload 402 may include about 184 bytes of data, such as video content, audio content, trick play data, or the like. However, the invention is not limited to these values. Header 404 may be a four byte (32 bit) header that may include a variety of fields, including, synchronization bytes, flag bits indicating how a payload might be processed, a PID to indicate a stream to which a packet belongs, adaptation field control bits, continuity bits, and scrambling control bits 406. As further shown, by transport packets 400B and 400C, by varying scrambling control bits 406, the invention may indicate whether a payload is encrypted using an even encryption key (400B), an odd encryption key (400C), or is unencrypted (400A).

SEC 254 may provide the content key, along with program attribute information, rights and entitlements to access the content, or the like, in an Entitlement Control Message (ECM). Briefly, the ECM is typically a packet which includes information to determine a control word (CW), also known as the content key, for use in decrypting the content. Typically, a portion of the streaming content is selectively encrypted using the CW. The CW may be encrypted with a service key and provided within the ECM message. The service key may then be encrypted using an encryption key that may be specific to a user, and sent within a message frame, packet, or the like. For example, in one embodiment, the service key may be sent within an Entitlement Management Message (EMM). In one embodiment, the EMM may also include additional information such as subscription information, or the like, associated with a user.

The ECMs may be, in one embodiment, inserted into the selectively encrypted content stream such that their transmission may be offset by minus about half of a cryptoperiod. Moreover, ECMs may be inserted based on a pre-determined number of times per second based on a PCR. For example, in one embodiment, the ECMs may be inserted between about 5-25 times per second. However, the invention is not so limited, and other frequencies may also be employed. SEC 254 may further insert an ECM at least one packet after each Intra-frame (I-frame) header, forward Predicted frame (P-frame) header, or even Bi-directional predicted frame (B-frames) header. In any event, SEC 254 is configured to enable the sending of the ECMs sufficiently in advance of each appropriate cryptoperiod, such that the encryption keys for the selectively encrypted content may be employed.

SEC 254 may selectively encrypt various portions of content stream based in part on one or more selection rules. Such selection rules may be dynamically modified based on a condition, event, or the like. For example, in one embodiment, if it is determined that increased security is to be employed, SEC 254 may employ selection rules that may increase a strength of an encryption key, rotate keys more frequently, increase a number of portions that are selectively encrypted, or the like.

The selection rules may also be based, at least in part, based on a type of a portion of the content stream. Thus, for example, the selection rules may indicate that selective encryption is to occur at a transport packet level. The selection rules may further indicate that certain portions of the content stream might not be encrypted, or are left in the clear, including, for example, packets that include PES headers; video packets that include trick play data, such as picture start data, GOP start, sequence start, sequence end, or the like; and so forth. In one embodiment, the selection rules may indicate that PATs, ECMs, and/or PMTs are left in the clear (unencrypted). In another embodiment, the selection rules may indicate that video and/or audio packets are to be encrypted, randomly encrypted, selectively encrypted based on a condition, or the like.

In another embodiment, the selection rules may indicate that encryption is selectively applied to at least a portion of the video elementary stream (ES), the audio ES, the digital data ES, and any combination, and/or any portion of video, audio, data elementary streams. The selection rules may further include selectively encrypting at least a portion of an I-frame, P-frame, B-frame, and any combination of P, B, and I frames, while leaving another portion in the clear, or the like.

Figure 5:
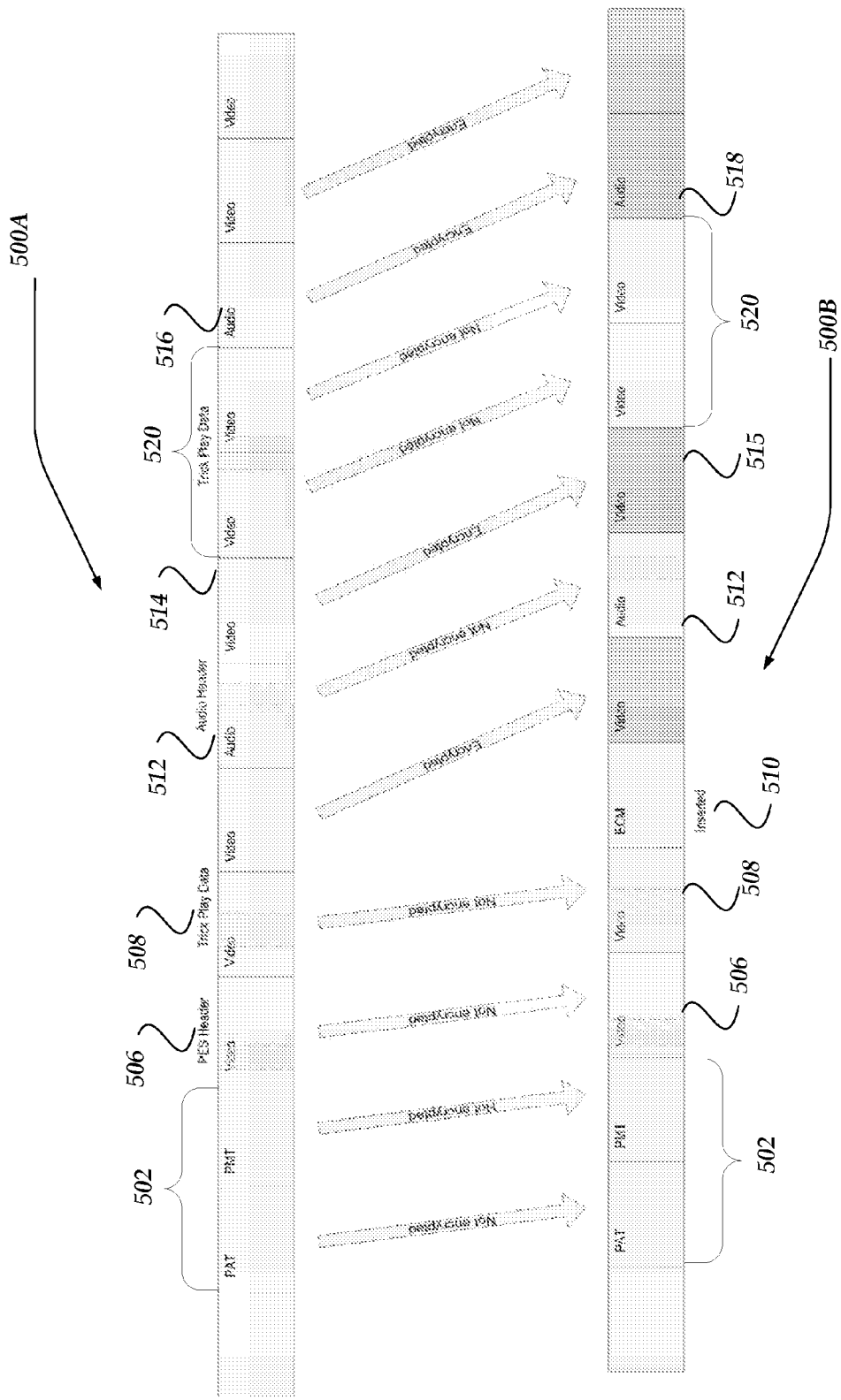
FIG. 5 illustrates functional diagrams generally showing one embodiment of selectively encrypted portions of a transport stream.

FIG. 5 may be employed to illustrate one example of selectively encrypting a content stream, according to the invention. As shown in the figure is unencrypted content stream 500A, and selectively encrypted content stream 500B. Unencrypted content stream 500A includes, among other components, PAT/PMT headers 502, PES header 506, trick play data 508 and 520, audio data 512 and 516, and video data 514 packets. Also illustrated in the figure is ECM 510, which has been inserted into selectively encrypted content stream 500B. Selectively encrypted content stream 500B is intended to illustrate one embodiment of unencrypted content stream 500A after application of a possible set of selection rules.

Employing at least some of the above-identified selection rules, selectively encrypted content stream 500B illustrates that PAT/PMT 502 remain unencrypted, as does PES header 506, and trick play data 508 and 508. In addition, at least some of the audio data and/or the video data packets may be encrypted. Thus, as shown, audio data 512 packet remains unencrypted, while audio data 518 and video data 515 are encrypted. It should be clear that FIG. 5 is merely an example, and other and/or different components of a content stream may be encrypted, or remain unencrypted based on the selection rules employed.

In another embodiment, the invention may modify the PMT to include various encryption information. Briefly, the PMT may include program element identifiers (PIDs) for packets in a content stream, such as audio elements, video elements, aux data, program clock references, and the like. A PMT may also include encryption information relative to an ECM message. For example, in one embodiment, the PMT may be selectively modified to include Conditional Access (CA) information. In one embodiment, the CA information may specify a system identifier associated with a Certification Authority, a content provider, a VOD selective encryption server, or the like. In another embodiment, the PMT may also be modified to include a PID associated with the ECM stream. In another embodiment, the PMT may be modified to include a stream descriptor, such as where the ECM stream is a PES stream (e.g., a stream type PES private), or the like.

Illustrative Client Device

Figure 3:
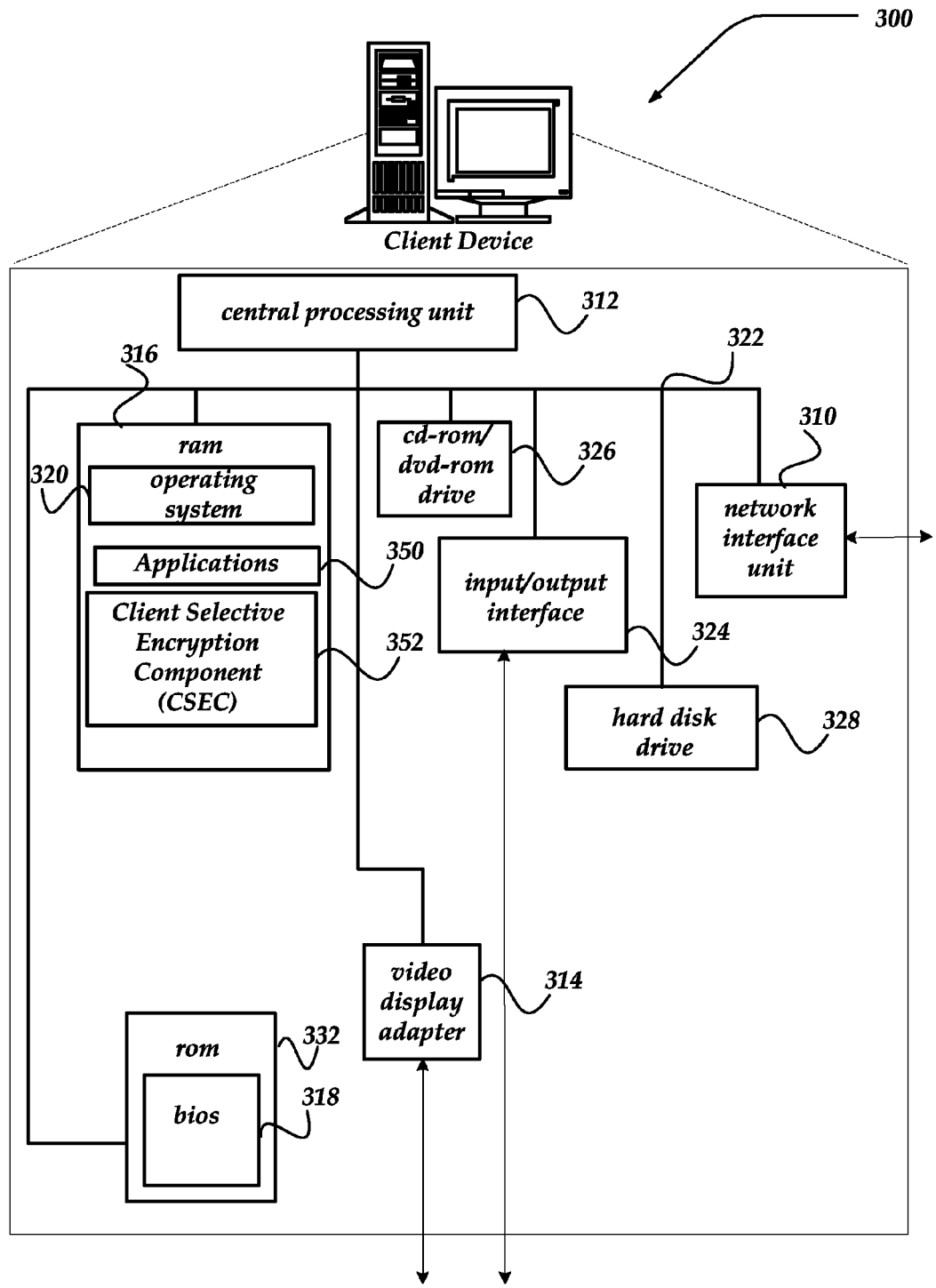
FIG. 3 shows one embodiment of a client device that may be included in a system implementing the invention.

FIG. 3 shows one embodiment of a computing device, according to one embodiment of the invention. Client Device 300 may include many more components than those shown. The components shown, however, are sufficient to disclose an illustrative embodiment for practicing the invention. Client Device 300 may represent, for example, Client Device 106 of FIG. 1.

Client Device 300 includes processing unit 312, video display adapter 314, and a mass memory, each in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of Client Device 300. Any general-purpose operating system may be employed. Basic input/output system ("BIOS") 318 is also provided for controlling the low-level operation of client device 300. As illustrated in FIG. 3, Client Device 300 also can communicate with the Internet, or some other communications network, such as network 105 in FIG. 1, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Client Device 300 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion.

Client Device 300 may also includes input/output interface 324 for communicating with external devices, such as a hand-held remote control device, mouse, keyboard, scanner, or other input devices not shown in FIG. 3. Likewise, client device 300 may further include additional mass storage facilities such as CD-ROM/DVD-ROM drive 326 and hard disk drive 328. Hard disk drive 328 may be utilized to store, among other things, application programs, databases, client device configuration information, policy, and the like.

The mass memory also stores program code and data. One or more applications 350 are loaded into mass memory and run on operating system 320. Examples of application programs may include, but is not limited to transcoders, schedulers, calendars, database programs, word processing programs, HTTP programs, audio players, video players, VoD players, decoders, decrypters, PPV players, interface programs to an STB, interface programs to a television, video camera, and so forth. Mass storage may further include applications such as Client Selective Encryption Component (CSEC) 352, which may be downloaded from another computing device, such as server 102, content provider server 101 of FIG. 1, or even another network device, portable storage device, or the like. In at least one embodiment, CSEC 352 may be configured to perform actions substantially similar to SEC 254 of FIG. 2. That is, CSEC 352 may receive unencrypted content (content in the clear) and selectively encrypt at least a portion of the content. In one embodiment, CSEC 352 may employ a process similar to process 600 described below to selectively encrypt at least a portion of the content within client device 300.

Generalized Operation

Figure 6:
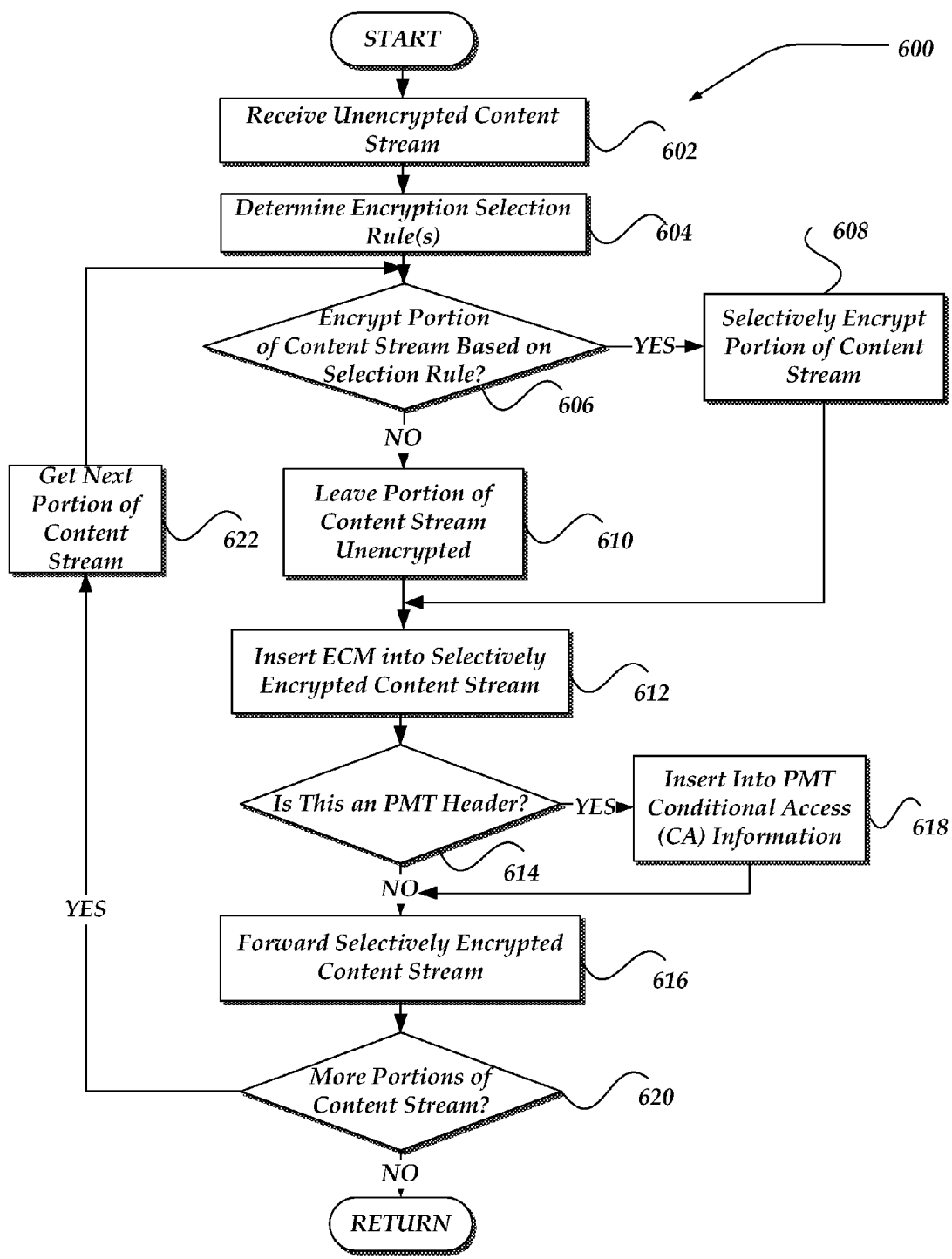
FIG. 6 illustrates a logical flow diagram generally showing one embodiment of a process for selectively encrypting portions of a transport stream, in accordance with the present invention.

The operation of certain aspects of the invention will now be described with respect to FIG. 6. FIG. 6 illustrates a logical flow diagram generally showing one embodiment of a process for selectively encrypting portions of a transport stream, in accordance with the present invention. Process 600 of FIG. 6 may be implemented, for example, within SES 102 of FIG. 1, and/or CSEC 352 of FIG. 3.

Process 600 begins, after a start block, at block 602 where an unencrypted content stream is received. In one embodiment, the unencrypted content stream is received from such as a content provider, a portable storage device, or the like. However, the invention is not so limited, and the unencrypted content stream may also be received within a client device as a result of decrypting a content stream for playing, or the like.

Processing proceeds next to block 604 where one or more encryption selection rules are determined. Such selection rules may include at least some of the selection rules described above, including leaving trick play data in the clear (unencrypted), leaving PES header packets in the clear, or the like. Processing then flows to decision block 606 to determine whether a current portion of the unencrypted content stream is to be encrypted, based in part on one or more determined selection rules.

A determination of whether to encrypt a portion of the content stream may, in some instances, result in buffering of at least some of the content stream. For example, where content spans more than one packet, multiple packets may be buffered to determine whether to encrypt, or not. As an example, as shown in FIG. 5, trick play data 520 is shown to span multiple packets. Thus, in one embodiment, to determine whether to encrypt or not, multiple packets may be examined. In any event, if the current portion (e.g., one or more packets) is to be selectively encrypted, processing flows to block 608; otherwise, processing flows to block 610. At block 610, the current portion is left unencrypted, and processing continues to block 612.

At block 608, the current portion of the content stream is selectively encrypted. The encryption may employ a variety of encryption techniques, including rotating of encryption keys, varying a strength of encryption, or the like, as described above. Moreover, as described above, the selective encryption may, in one embodiment, result in selectively encrypting more than one packet in the content stream. Selective encryption may further include modifying a scrambling control bit in a header to indicate that different encryption keys are employed, that encryption is performed, or the like. Processing then continues to block 612.

At block 612, one or more ECMs may be inserted into the selectively encrypted content stream based in part on the discussion above. Processing next flows to decision block 614, where a determination is made whether the current portion of the content stream includes a PMT header. If it does, processing branches to block 618; otherwise, processing continues to block 616.

At block 618, the PMT header may be modified by inserting Conditional Access information, and/or additional information. Processing then flows to block 616.

Process 600 then flows to block 616, where the selectively encrypted portion of content stream may then be forwarded, thereby enabling, in one embodiment, encryption on the fly In one embodiment, the selectively encrypted content stream may be forwarded to a client device, such as client device 106 of FIG. 1. In another embodiment, the selectively encrypted content stream may be forwarded to another process, a storage device, or the like.

Processing continues to decision block 620, where a determination is made whether there are additional portions of the content stream to evaluate. If so, processing flows to block 622, where the next portion of the content stream is received, and processing loops back to decision block 606 to apply the selection encryption selection rule(s). However, if at decision block 620, there are no more portions of the content stream to evaluate for selective encryption, process 600 then returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A server device for managing content encryption, comprising:
   a transceiver for receiving and sending information between another computing device;
   a processor in communication with the transceiver; and
   a memory in communication with the processor and for use in storing data and machine instructions that causes the processor to perform a plurality of operations, including:
   receiving an unencrypted content stream;
   buffering a plurality of packets of the unencrypted content stream;
   determining for selective encryption at least a portion of the unencrypted content stream based on the plurality of buffered packets;
   encrypting the plurality of buffered packets;

encrypting at least the portion of the unencrypted content stream, while leaving at least another portion of the unencrypted content stream unencrypted based on a selection rule that leaves at least trick play data comprising a Program Association Table in the content stream unencrypted;

if a Program Map Table header is determined to be present in a portion of the unencrypted content stream, modifying at least that portion of the unencrypted content stream by at least inserting further information into the Program Map Table; and inserting an Entitlement Control Message (ECM) within the encrypted content stream, and wherein the ECM includes at least two encryption keys, wherein at least one encryption key is associated with a first cryptoperiod and at least a second encryption key is associated with a second cryptoperiod.

2. The server device of claim 1, wherein the selection rule further comprises indicating that if a portion of the unencrypted content stream includes at least one of picture start data, group of pictures start data, a sequence start, or sequence end data, then leaving that portion of the unencrypted content stream as unencrypted within the encrypted content stream.

3. The server device of claim 1, wherein the selection rule further comprises at least one rule indicating that at least a portion of a video payload or an audio payload is encrypted within the encrypted content stream.

4. The server device of claim 1, wherein the plurality of operations, further including:
employing the unencrypted trick play data within the encrypted content stream to generate at least one trick play index file indicating a location of a content frame for the trick play data in the encrypted content stream.

5. The server device of claim 1, wherein encrypting at least a portion of the unencrypted content stream further comprises employing a key rotation mechanism, wherein at least a first portion of the encrypted content stream is encrypted using a first encryption key, while, at least a second portion of the encrypted content stream is encrypted using a second encryption key.

6. The server device of claim 1, wherein the selection rule further comprises an indication that a content stream packet that includes at least a portion of an PES header remains unencrypted.

7. The server device of claim 1, wherein the further information inserted into the Program Map Table further comprises conditional access information that includes at least one of a system identifier associated with a Certification Authority, a system identifier associated with a content provider, a system identifier associated with a VOD selective encryption server, a PID associated with a ECM stream, or a stream descriptor.

8. A system for managing content encryption over a network, comprising:
a content server that is configured to provide unencrypted content over the network;
an encryption server that is configured to receive unencrypted content from the content server, and to perform actions, including:
buffering a plurality of packets of the unencrypted content stream;
determining for selective encryption at least a portion of the unencrypted content stream based on the plurality of buffered packets;
encrypting the plurality of buffered packets;
encrypting at least the portion of the unencrypted content, wherein at least another portion of the unencrypted content having trick play data comprising a Program Association Table remains unencrypted;
if a Program Map Table header is determined to be present in a portion of the unencrypted content stream, modifying at least that portion of the unencrypted content stream by at least inserting further information into the Program Map Table; and
inserting an Entitlement Control Message (ECM) within the encrypted content stream, wherein the ECM includes at least two encryption keys associated with the encrypted portion of the content, and wherein at least one encryption key is associated with a first cryptoperiod and at least a second encryption key is associated with a second cryptoperiod.

9. The system of claim 8, wherein at least a portion of trick play data remains unencrypted further comprises leaving at least one of picture start data, or sequence data unencrypted.

10. The system of claim 8, wherein encrypting further comprises leaving unencrypted a Packetized Elementary Stream (PES) header.

11. The system of claim 8, wherein encrypting further comprises randomly encrypting at least some video or audio payloads, while leaving other video or audio payloads unencrypted in the encrypted content.

12. The system of claim 8, the actions of the encryption server further comprising:
generating a trick index file based on the unencrypted trick play data within the encrypted content; and
employing the trick index file to enable a client device to perform at least one of a fast forward, or a fast reverse of the content.

13. The system of claim 8, wherein the further information inserted into the Program Map Table further comprises conditional access information that includes at least one of a system identifier associated with a Certification Authority, a system identifier associated with a content provider, a system identifier associated with a VOD selective encryption server, a PID associated with a ECM stream, or a stream descriptor.

14. A method of protecting a media content stream over a network, comprising:
receiving unencrypted media content stream;
buffering a plurality of packets of the unencrypted content stream;
determining for selective encryption at least a portion of the unencrypted content stream based on the plurality of buffered packets;
encrypting the plurality of buffered packets;
encrypting at least the portion of the unencrypted media content stream, while leaving unencrypted each portion of the media content stream having media trick play data comprising a Program Map Table in the media content stream;
if a Program Map Table header is determined to be present in a portion of the unencrypted content stream, modifying at least that portion of the unencrypted content stream by at least inserting further information into the Program Map Table;
inserting an Entitlement Control Message (ECM) within the encrypted content stream, and wherein the ECM includes at least two encryption keys, wherein at least one encryption key is associated with a first cryptoperiod and at least a second encryption key is associated with a second cryptoperiod; and
sending the encrypted media content stream over the network to at least one client device.

15. The method of claim 14, wherein encrypting further comprising employing at least two encryption keys, and randomly switching between the at least two encryption keys for encrypting at least the portion of the unencrypted media content stream.

16. The method of claim 14, wherein encrypting further comprising modifying a transport packet header to indicate whether a type of encryption control bit.

17. A non-transient computer readable storage medium configured to include program instructions for performing the method of claim 14.

18. The method of claim 14, wherein the further information inserted into the Program Map Table further comprises conditional access information that includes at least one of a system identifier associated with a Certification Authority, a system identifier associated with a content provider, a system identifier associated with a VOD selective encryption server, a PID associated with a ECM stream, or a stream descriptor.

19. A non-transitory computer-readable storage medium having computer-executable instructions stored thereon for managing content securely, the computer-executable instructions when installed onto a computing device enable the computing device to perform actions, comprising:
 receiving unencrypted content stream;
 buffering a plurality of packets of the unencrypted content stream;
 determining for selective encryption at least a portion of the unencrypted content stream based on the plurality of buffered packets;
 encrypting the plurality of buffered packets;
 encrypting at least the portion of the unencrypted content stream, while leaving unencrypted each portion of the content stream having media trick play data comprising a Program Map Table in the media content stream;
 if a Program Map Table header is determined to be present in a portion of the unencrypted content stream, modifying at least that portion of the unencrypted content stream by at least inserting further information into the Program Map Table;
 inserting an Entitlement Control Message (ECM) within the encrypted content stream, and wherein the ECM includes at least two encryption keys, wherein at least one encryption key is associated with a first cryptoperiod and at least a second encryption key is associated with a second cryptoperiod; and
 storing the encrypted content stream.

20. The non-transitory computer-readable storage medium of claim 19, wherein the non-transitory computer-readable storage medium resides within a client computing device.

21. The non-transitory computer-readable storage medium of claim 19, wherein leaving the media trick play data unencrypted further comprises leaving at least one of picture start data, group of pictures start data, a sequence start, or sequence end data unencrypted within the encrypted content stream.

22. The non-transitory computer-readable storage medium of claim 19, wherein the further information inserted into the Program Map Table further comprises conditional access information that includes at least one of a system identifier associated with a Certification Authority, a system identifier associated with a content provider, a system identifier associated with a VOD selective encryption server, a PID associated with a ECM stream, or a stream descriptor.

* * * * *